United States Patent [19]

Broquere et al.

[11] Patent Number: 4,709,457
[45] Date of Patent: Dec. 1, 1987

[54] PROCESS FOR MANUFACTURING A TURBINE OR COMPRESSOR WHEEL MADE OF COMPOSITE MATERIAL AND WHEEL THUS OBTAINED

[75] Inventors: Bernard Broquere, Bordeaux; Jacques Etienne, Le Taillan-Medoc, both of France

[73] Assignee: Societe Europeenne De Propulsion, Puteaux, France

[21] Appl. No.: 764,662

[22] Filed: Aug. 9, 1985

[30] Foreign Application Priority Data

Aug. 13, 1984 [FR] France .............................. 84 12740

[51] Int. Cl.$^4$ .............................................. B21K 3/00
[52] U.S. Cl. ...................................... 29/156.8 R; 29/456
[58] Field of Search ............... 29/156.8 R, 156.8 CF, 29/156.8 P, 456; 156/155, 89; 428/64, 65, 371

[56] References Cited

U.S. PATENT DOCUMENTS 3,219,503 11/1965 Blair .
3,993,817 11/1976 Schulz .
4,119,189 10/1978 Ehrerreich ........................ 428/371
4,348,458 9/1982 Otstot ............................... 428/371
4,488,920 12/1984 Davis ................................ 156/155
4,490,201 12/1984 Leeds ............................... 156/155
4,515,847 5/1985 Taverna et al. .................... 156/155

Primary Examiner—Howard N. Goldberg
Assistant Examiner—Irene Graves Gelabi
Attorney, Agent, or Firm—Shenier & O'Connor

[57] ABSTRACT

This invention relates to a process for manufacturing a turbine or compressor wheel made of composite material, comprising the following steps of:
  making at least two helicoidal textures each formed by weaving a spiral band with helicoidal warp yarns and weft yarns which are substantially perpendicular to the axis of the texture,
  assembling the helicoidal textures by "screwing" them in each other and stacking them by mutually approaching their interlaced turns, and
  densifying the stack thus made to obtain a preform of a turbine or compressor wheel.

4 Claims, 6 Drawing Figures

FIG. 1
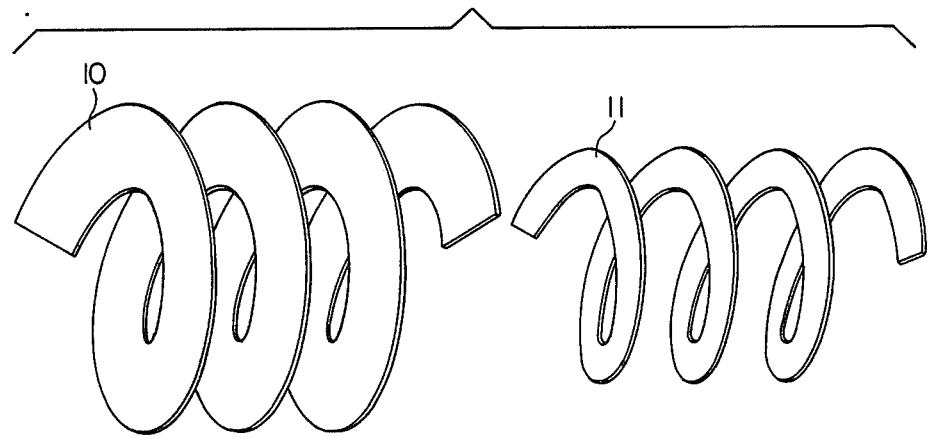
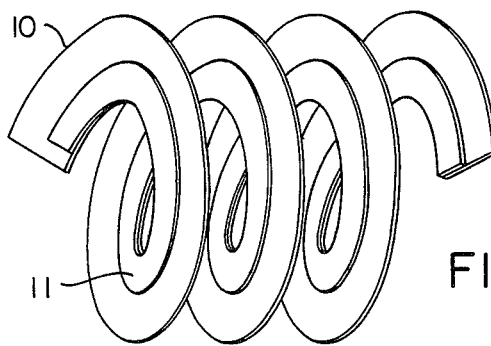
FIG. 2
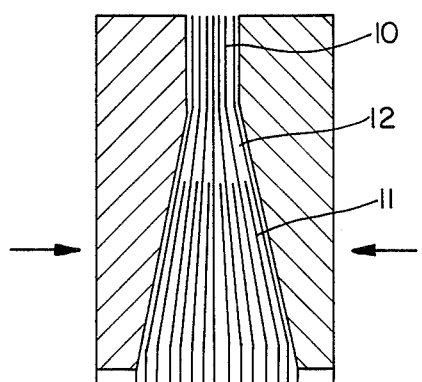
FIG. 3
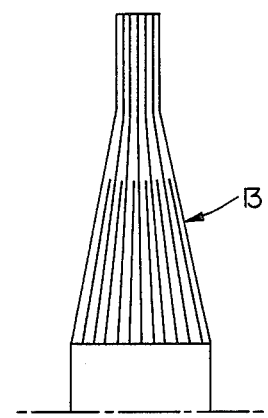
FIG. 4

PROCESS FOR MANUFACTURING A TURBINE OR COMPRESSOR WHEEL MADE OF COMPOSITE MATERIAL AND WHEEL THUS OBTAINED

The present invention relates to a turbine or compressor wheel made of composite material.

The use of composite materials for manufacturing turbo-machine parts necessitates using fibrous reinforcement having high mechanical characteristics. The nature of the fibers constituting the reinforcement is selected as a function of the chemical and thermal conditions of the environment in which the parts are to be used. The orientation and distribution of the fibers are determined as a function of the thermo-mechanical stresses.

It is an object of the invention to provide a process for obtaining, at an advantageous cost, fibrous reinforcing structures which are particularly well adapted to making wheels of turbines or compressors.

This purpose is attained by a process comprising, in accordance with the invention, the following steps of:

making at least two helicoidal textures each formed by weaving a spiral band with helicoidal warp yarns and weft yarns which are substantially perpendicular to the axis of the texture, assembling the helicoidal textures by "screwing" them in each other and stacking them by mutually approaching their interlaced turns, and densifying the stack thus made to obtain a preform of a turbine or compressor wheel.

The spiral weave textures are particularly well adapted to making pieces used in rotation in which the mechanical efforts generate stresses essentially in circumferential traction and in radial traction.

Furthermore, the stacking of a plurality of textures makes it possible, by an appropriate choice of the dimensions of such textures, to produce wheel preforms of thickness varying from the small diameter, in the vicinity of the hub, up to the periphery. For example, the stacking of a plurality of textures of the same small diameter but of different large diameters allows the production of preforms of thickness decreasing from the vicinity of the hub up to the periphery. Such preforms are therefore particularly well adapted to the production of wheels of turbines or compressors. Final manufacture of the preform by machining is facilitated and, in particular, a very important saving of material is made in comparison with the use of cylindrical preforms of constant thickness.

The invention also relates to a turbine or compressor wheel as obtained by carrying out the process defined hereinbefore.

The turbine or compressor wheel made of composite material is, according to the invention, characterized in that it comprises a reinforcing structure formed by the stacking of a plurality of helicoidal textures "screwed" one in the other, each texture being formed by a spirally woven band with helicoidal warp yarns and weft yarns substantially perpendicular to the axis of the texture.

The invention will be more readily understood on reading the following description with reference to the accompanying drawings, in which:

FIG. 1 is a view in perspective showing two helicoidal textures intended for making a turbine wheel according to the invention.

FIG. 2 is a view in perspective illustrating the assembly of the textures of FIG. 1.

FIG. 3 is a schematic view in section showing the textures of FIG. 1 assembled and stacked in a tool for densification, and FIG. 4 is a schematic view in section showing the preform obtained after densification in the tool of FIG. 3.

Figure 5:
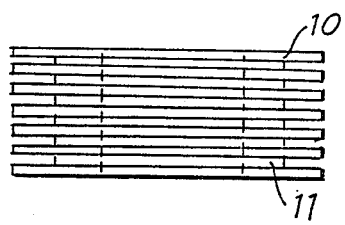
FIG. 5 is an elevation of the body shown in FIG. 2 in the condition it assumes when the turns of the body are brought clsoe together by applying a compressive force in the direction of the axis of the body.
Figure 6:
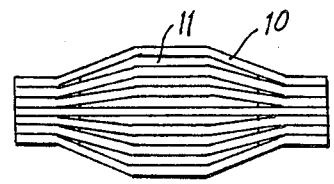
FIG. 6 is an elevation showing the configuration of the body when a forming die of the type shown in FIG. 3 is employed.

Referring now to the drawings, the two textures 10 and 11 of FIG. 1 are constituted by fibrous reinforcing bands, each band having a surface generated by a segment of which the vertices describe two coaxial helices of the same pitch and which extends in a direction substantially perpendicular to the axis of these helices.

The helicoidal textures 10 and 11 are made by spiral weaving with helicoidal warp yarns and weft yarns perpendicular to the axis of the texture. This mode of weaving has been known for a long time. Reference may be made for example to French Patent No. 646 341 of Dec. 24, 1926.

The yarns used are for example yarns formed by fibers of carbon, silicon carbide, alumina, Kevlar, or yarns based on other fibers having high mechanical and/or thermal characteristics. Weaving may be of the cloth, satin or other type.

Textures 10 and 11 present the same inner diameter d, but different outer diameters D1 and D2, the and forming texture 10 being wider than the one forming texture 11.

The two textures 10 and 11 are assembled with the same pitch by "screwing" one of the textures in the other. In this way, each turn of one texture is intercalated between two turns of the other texture (FIG. 2).

After assembly, the textures are stacked. Texture 11 having an outer diameter smaller than that of texture 10, an excess thickness may thus be obtained in the part adjacent the smaller diameter, i.e. in that part intended to form the hub of the wheel.

With a view to densification of the reinforcing structure, the latter is placed in a tool maintaining the textures 10 and 11 stacked. As shown in FIG. 3, this tool is constituted essentially by a mould of which the annular cavity 12 presents, in cross-section, a first part whose width decreases from the small diameter in the direction of the periphery and a second part of constant width which joins the first part and extends radially up to the large diameter.

As is known per se, densification consists in infiltrating a matrix within the porosity of the reinforcing structure. The matrix is for example made of refractory material such as carbon or silicon carbide. Infiltration is effected for example by chemical vapor deposition or by liquid impregnation followed by a heat treatment.

After densification, the preform 13 obtained (FIG. 4) is machined to form the desired wheel; the blades of the wheel are made by machining the peripheral part of the preform. The use of a plurality of helicoidal textures of different dimensions enables a preform to be obtained which is similar to the shape of the final piece; there is therefore a very substantial saving of material.

In certain cases, it is advantageous to weave at least one of the helicoidal textures with a weight per square meter which varies between the small diameter and the large diameter. For example, by increasing the density of helicoidal warp yarns on the small diameter side, a preform is obtained with a circumferential reinforcement rate higher near the hub than near the periphery.

Other modifications and additions may be made to the embodiment described hereinbefore without departing from the scope of protection as defined by the accompanying claims. In particular, the number of helicoidal textures used may be greater than two.

What is claimed is:

1. A process for manufacturing a turbine or compressor wheel made of composite material, said process comprising the following steps of:

making at least two helicoidal textures each formed by weaving a spiral band with helicoidal warp yarns and weft yarns which are substantially perpendicular to the axis of the texture, assembling the helicoidal textures by "screwing" them in each other and stacking them by mutually approaching their interlaced turns, and densifying the stack thus made to obtain a preform of a turbine or compressor wheel.

2. The process of claim 1, wherein helicoidal textures formed by bands of different widths are assembled.

3. The process of claim 2 wherein at least one of the textures is woven with a variable weight per square meter so as to obtain a variable reinforcement rate within the preform 4. The process of claim 1 wherein at least one of the textures is woven with a variable weight per square meter so as to obtain a variable reinforcement rate within the preform.

* * * * *